(12) United States Patent
Gupta et al.

(10) Patent No.: US 9,185,464 B2
(45) Date of Patent: Nov. 10, 2015

(54) SERVICE ALERT MESSAGES FOR CUSTOMER PREMISES COMMUNICATION DEVICES

(75) Inventors: Kapil Gupta, Wesley Chapel, FL (US); Manohar R. Kesireddy, Lewisville, TX (US); Sharath B. Vaddempudi, Irving, TX (US); Syam S. Suri, Wesley Chapel, FL (US); Sudarshan Chavva, Carrollton, TX (US); Ashok Kumar, Wesley Chapel, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 100 days.

(21) Appl. No.: 13/233,069

(22) Filed: Sep. 15, 2011

(65) Prior Publication Data

US 2013/0074118 A1 Mar. 21, 2013

(51) Int. Cl.
| | |
|---|---|
| *H04N 7/10* | (2006.01) |
| *H04N 7/025* | (2006.01) |
| *H04N 21/488* | (2011.01) |
| *H04N 21/239* | (2011.01) |
| *H04N 21/25* | (2011.01) |
| *H04N 21/258* | (2011.01) |
| *H04N 21/262* | (2011.01) |
| *H04N 21/437* | (2011.01) |
| *H04N 21/45* | (2011.01) |
| *H04N 21/81* | (2011.01) |
| *H04N 21/2543* | (2011.01) |
| *H04H 60/32* | (2008.01) |

(52) U.S. Cl.
CPC ......... *H04N 21/4882* (2013.01); *H04N 21/239* (2013.01); *H04N 21/2393* (2013.01); *H04N 21/25* (2013.01); *H04N 21/258* (2013.01); *H04N 21/2543* (2013.01); *H04N 21/25808* (2013.01); *H04N 21/25866* (2013.01); *H04N 21/262* (2013.01); *H04N 21/437* (2013.01); *H04N 21/45* (2013.01); *H04N 21/8126* (2013.01); *H04H 60/32* (2013.01); *H04H 2201/70* (2013.01)

(58) Field of Classification Search
CPC . H04N 21/239; H04N 21/2393; H04N 21/25; H04N 21/2543; H04N 21/258; H04N 21/25808; H04N 21/25866; H04N 21/262; H04N 21/437; H04N 21/45; H04N 21/4882; H04N 21/8126
USPC ..................................................... 725/32–34
See application file for complete search history.

(56) References Cited

U.S. PATENT DOCUMENTS

| | | | |
|---|---|---|---|
| 7,707,599 B1 * | 4/2010 | Groff et al. ........................ 725/5 |
| 2002/0124252 A1 * | 9/2002 | Schaefer et al. ................. 725/33 |
| 2004/0109457 A1 * | 6/2004 | Johnson et al. ................ 370/401 |
| 2005/0069105 A1 * | 3/2005 | Whynot ....................... 379/93.01 |
| 2008/0120639 A1 * | 5/2008 | Walter et al. .................... 725/33 |
| 2008/0178212 A1 * | 7/2008 | Kinoshita et al. .............. 725/32 |
| 2009/0245107 A1 * | 10/2009 | Krishnaswamy et al. ..... 370/232 |
| 2010/0058375 A1 * | 3/2010 | LaFreniere et al. ............... 725/9 |
| 2010/0162346 A1 * | 6/2010 | Holostov et al. .................. 726/1 |
| 2011/0099283 A1 * | 4/2011 | Park et al. ...................... 709/230 |

* cited by examiner

*Primary Examiner* — Jeremy Duffield

(57) ABSTRACT

A method includes providing identifying information for a customer premises communication device to a provider network, wherein the customer premises communication device is a node of a customer premises network. The method may further include registering a communication channel between the customer premises communication device and the provider network. In addition, the method may include receiving at least one service alert message from the provider network using the communication channel. The type of service alert message is selected based on the customer premises communication device.

20 Claims, 7 Drawing Sheets

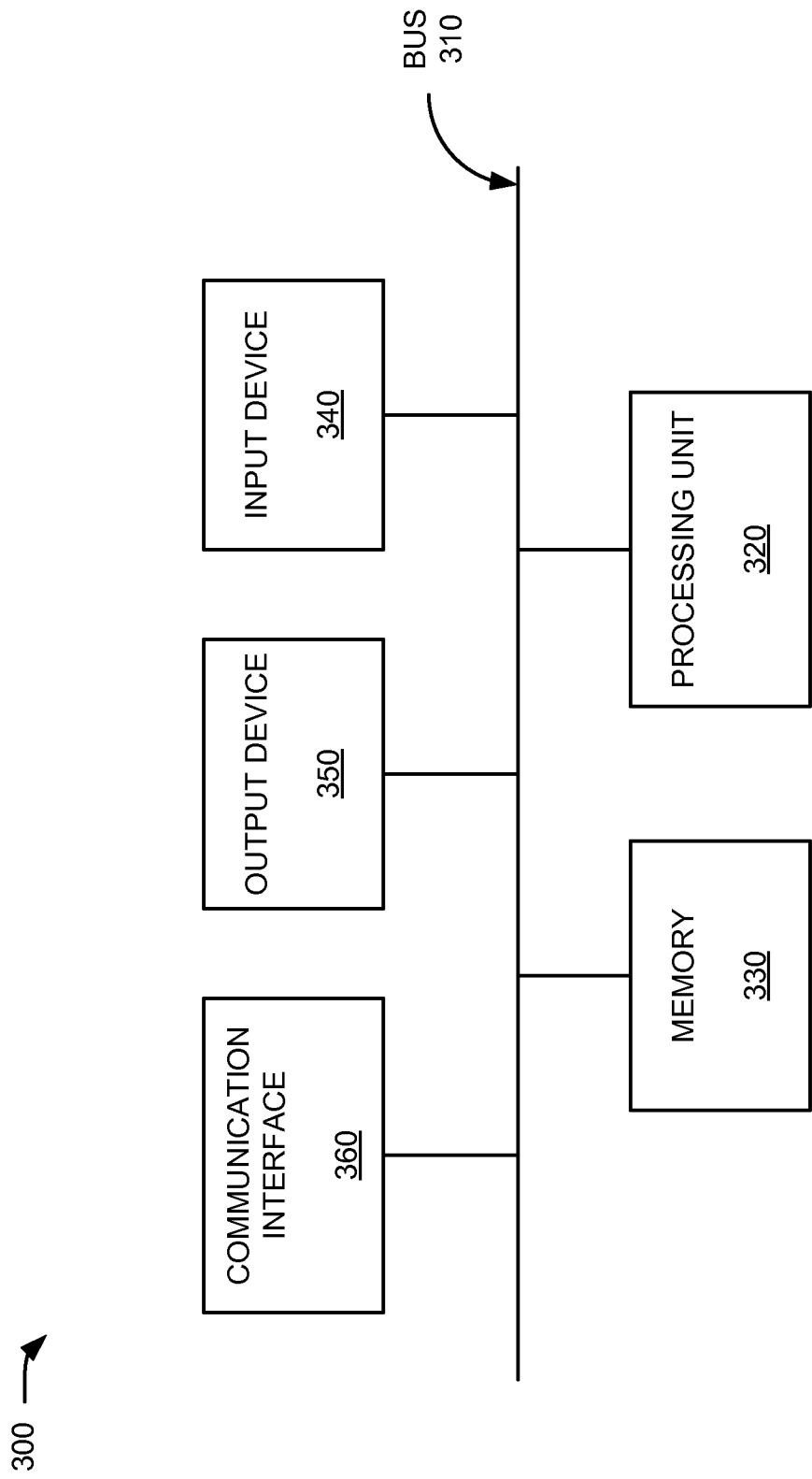

SERVICE ALERT MESSAGES FOR CUSTOMER PREMISES COMMUNICATION DEVICES

BACKGROUND INFORMATION

Telecommunications providers currently provide multiple services, including cable television, Internet, and mobile telephone services, to their customers. In some instances, individual customers may receive combinations of these multiple services from a single telecommunications provider. The telecommunications providers manage relationships with their customers using customer accounts that include the multiple services.

BRIEF DESCRIPTION OF THE DRAWINGS

FIG. 3 illustrates an exemplary configuration of one or more of the components of FIG. 1;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments described herein relate to devices, methods, and systems for providing service alerts to customer premises communication devices. Customer premises communication devices may include communication devices that are nodes of a customer premises network. Consistent with the embodiments described herein, communication channels may be established between a provider network and the customer premises communication device for service alert messages. Different customer premises communication devices may receive selected types of service alert messages from the provider network. The service alert messages may be selected by the customer and matched to particular communication channels, including the customer premises communication devices.

In addition, embodiments described herein relate to devices, methods, and systems for providing access for an interactive voice recognition system to a customer communication device through a messaging system. Consistent with the embodiments described herein, customer communication devices, including the customer premises communication devices, may be accessed through an interactive voice recognition system.

Figure 1:
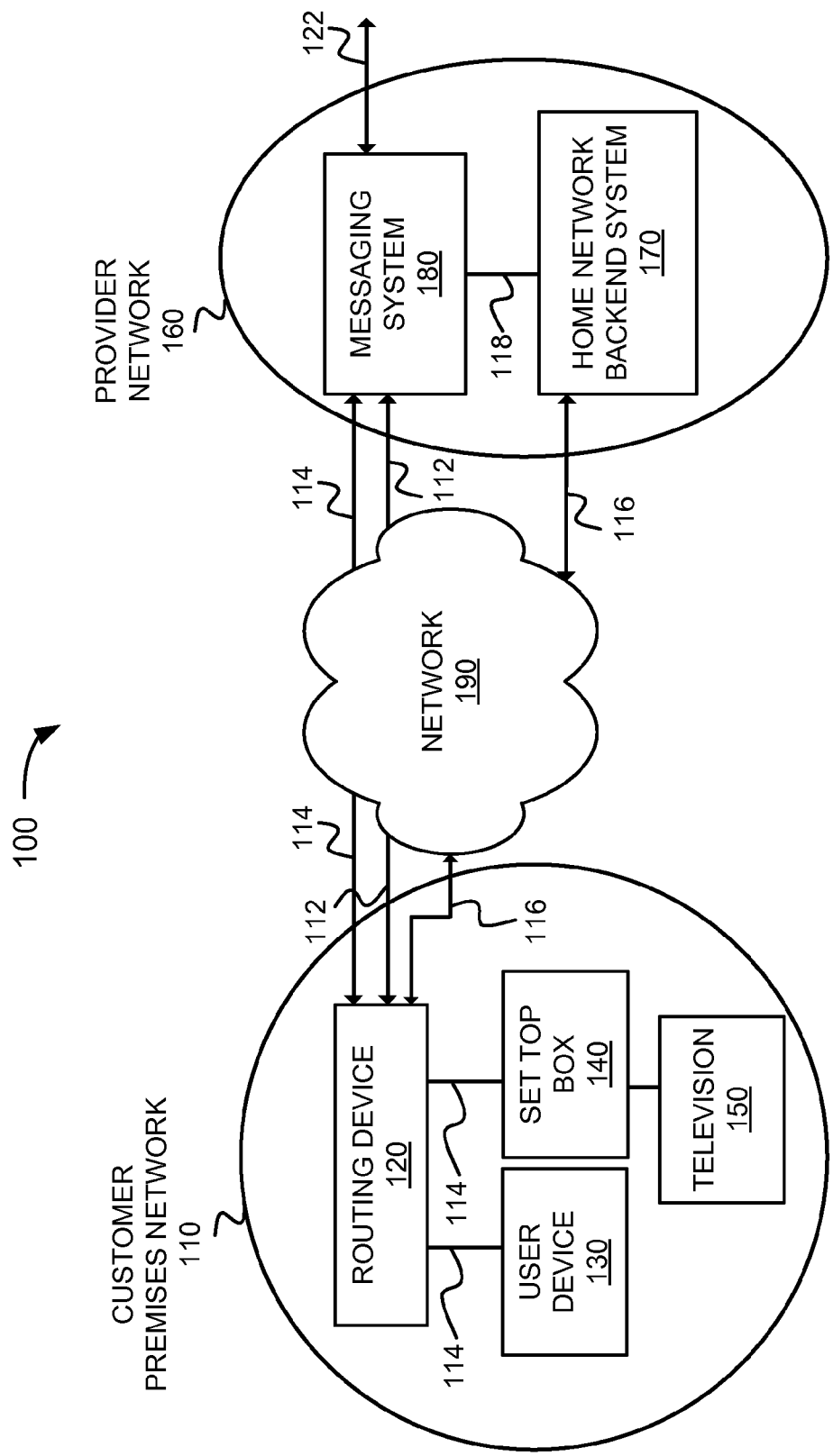
FIG. 1 illustrates an exemplary network in which systems and methods described herein may be implemented.

FIG. 1 is a diagram of an exemplary network 100 in which systems and/or methods described herein may be implemented. As illustrated, network 100 may include a customer premises network 110, and a provider network 160. Customer premises network 110 may include a routing device 120, a user device 130, a set top box (STB) 140, and a television 150 located, for example, in a customer's home. Provider network 160 may include a home network backend system 170, and a messaging system 180. Customer premises network 110 and provider network 160 may be interconnected by network 190. Components of network 100 may be interconnected via wired and/or wireless connections. The configuration of components of network 100 illustrated in FIG. 1 is for illustrative purposes only. Other configurations may be implemented. Therefore, network 100 may include additional, fewer and/or different components than those depicted in FIG. 1. Also, in some instances, one or more of the components of network 100 may perform one or more functions described as being performed by another one or more of the components of network 100.

Network 100 provides a platform for a telecommunications service provider to provide service alert messages 114 from provider network 160 to one or more customer premises communication devices such as, but not limited to, user device 130 (e.g. a desktop, personal computer, laptop computer, palmtop, or tablet computer), or television 150, on customer premises network 110 as shown in FIG. 1, substantially simultaneously with the generation of service alert message 114. The services provided by the telecommunications provider may include Internet service, cable television, and/or other telecommunications service. Customer premises communication devices may include communication devices that are nodes of customer premises network 110. The customer premises communication devices provide customers and providers the ability to communicate over network 100.

Service alert messages 114 may be specific to particular customer accounts and include information that is of current relevance to a service received by the customer at customer premises network 110. For instance, service alert message 114 may contain information such as billing status, order status, promotional alerts, service outages, technical support information, and program alerts. According to one implementation, service alert message 114 includes information that requires a response by the customer that affects a service provided by the telecommunications provider to customer premises network 110. Service alert messages 114 may provide notification to the customer with substantially minimal delay after a service related event happens. In some instances, this may provide the opportunity to perform corrective actions for the service (e.g., fix a malfunctioning component on customer premises network 110) without contacting the telecommunications service provider. In another implementation, service alert message 114 may include an option to connect to a uniform resource locator (URL) for a website that may provide further service assistance. For example, the customer may access detailed information regarding billing. Service alert messages 114 may also include an instruction to upgrade an application security suite.

Provider network 160 includes home network backend system 170, and messaging system 180, and may manage the customer-provider relationship for a plurality of customers. Each customer may have a customer premises network 110 and one or more customer communications devices. Although not shown, provider network 160 may also include other components of a provider network for a telecommunications service provider such as customer information servers, advertising information servers, content distribution devices, content storage devices, application servers, billing devices, security devices, etc.

Home network backend system 170 may perform port mapping 116 from customer premises communication devices to provider network 160 for each customer premises communication device. For instance, home network backend system 170 may create a port mapping 116 to user device 130 from provider network 160, i.e., ports of devices of home network backend system 170 may be mapped to ports of user device 130. Home network backend system 170 may configure port mapping 116 of home network backend system 170 and the customer premises communication device using a routing table (not shown) at routing device 120. Home network backend system 170 may also communicate with messaging system 180 to exchange customer account and port forwarding information 118 for each customer account.

Home network backend system 170 may create and update port mapping rules and establish communication channels from provider network 160 to specific customer premises communication devices in customer premises network 110. For example, home network backend system 170 may perform a new port mapping 116 in instances in which there is a change in an Internet protocol (IP) address of the customer premises communication device.

Messaging system 180 may generate service alert messages 114 for each customer account based on particular customer account information such as, for example, billing status, location of customer premises network 110, services and programs subscribed to by a customer, and technical support activity. More particularly, messaging system 180 may gather service information 122 for each customer account in real time or near real time and determine whether the current service information 122 for that customer account requires a notification to the customer, i.e., output of a service alert message 114. Service information 122 may comprise information that affects the services provided by the telecommunications provider and may be general for all customers in some instances and specific to particular customers in other instances. For example, messaging system 180 receives performance information from STB 140 and generates service alert messages 114 in response to a determination that STB 140 is malfunctioning. In this case, the service alert message 114 may provide instructions to the user to aid in correcting the problem. As another example, messaging system 180 receives information regarding scheduled visit of technical support personnel and outputs a service alert message 114 to one or more of the customer premises communication devices. In another example, messaging system 180 outputs a service alert message 114 that includes a notification that warns the customer of impending service suspension due to non-payment. As still a further example, messaging system 180 determines a change in billing status for a particular service based on expiration of a limited time offer of a premium package.

Messaging system 180 may assign communication channels established by home network backend system 170 for particular types of service alert messages 114. For example, service alert messages 114 regarding billing, and service alert messages 114 regarding Internet service may be output to user device 130. The communication channels may be selected for different types of service alert messages 114 by the customer or an administrator of provider network 160. The customer may select a preferred combination of particular service alert messages 114 and customer premises communication devices on which service alert messages 114 are received. The different selected communication channels enable messaging system 180 to push messages to the customer premises communication devices.

Messaging system 180 may include one or more servers and one or more memory/storage devices. The servers of messaging system 180 may be registered 112 in the client registry for the customer premises communication device. The client registry for the customer premises communication device may contain data regarding messaging system 180. The client registry reflects that the server(s) of messaging system 180 have been authenticated. When messaging system 180 subsequently outputs service alert messages 114 to the customer premises communication device, messaging system 180 may push service alert messages 114 to the customer premises communication device based on the registry information and the previously selected combination of service alert messages 114 and customer communication devices.

Additionally, messaging system 180 may contain data specific to each customer account that may be accessible by a customer premises communication device via a web-based or application front-end for enabling queries for particular types of information in response to service alert messages 114. Messaging system 180 outputs service alert messages 114 to customer premises communication devices on customer premises network 110 via the network 190.

Network 190 may include one or more wired and/or wireless networks that are capable of receiving and transmitting data, voice and/or video signals, including multimedia signals that include voice, data and video information. Network 190 may include one or more packet switched networks, such as an Internet protocol (IP) based network, a local area network (LAN), a wide area network (WAN), a personal area network (PAN), an intranet, the Internet, or another type of network that is capable of transmitting data. Network 190 may include one or more high-speed data networks, such as a very high performance backbone network services (vBNS) network. The network 190 connects to customer premises network 110 through the router 120.

Customer premises network 110 (e.g., the customer's home) includes a routing device 120, and customer premises communication devices such as a user device 130, a STB 140, and a television 150. Customer premises network 110 may also include a remote control, and an optical network terminal (ONT) (not shown) that may receive data, e.g., on a fiber optic cable, and may transfer the data to television 150 or STB 140 through routing device 120. Routing device 120 may include one or more elements, such as switches, gateways, routers, etc., used to route data in customer premises network 110. Routing device 120 may send information to an application on the customer premises communication device designated by the customer. Routing device 120 may route data associated with a particular service alert messages 114 to particular customer premises communication devices. The customer premises communication devices may function as described below.

Figure 2A:
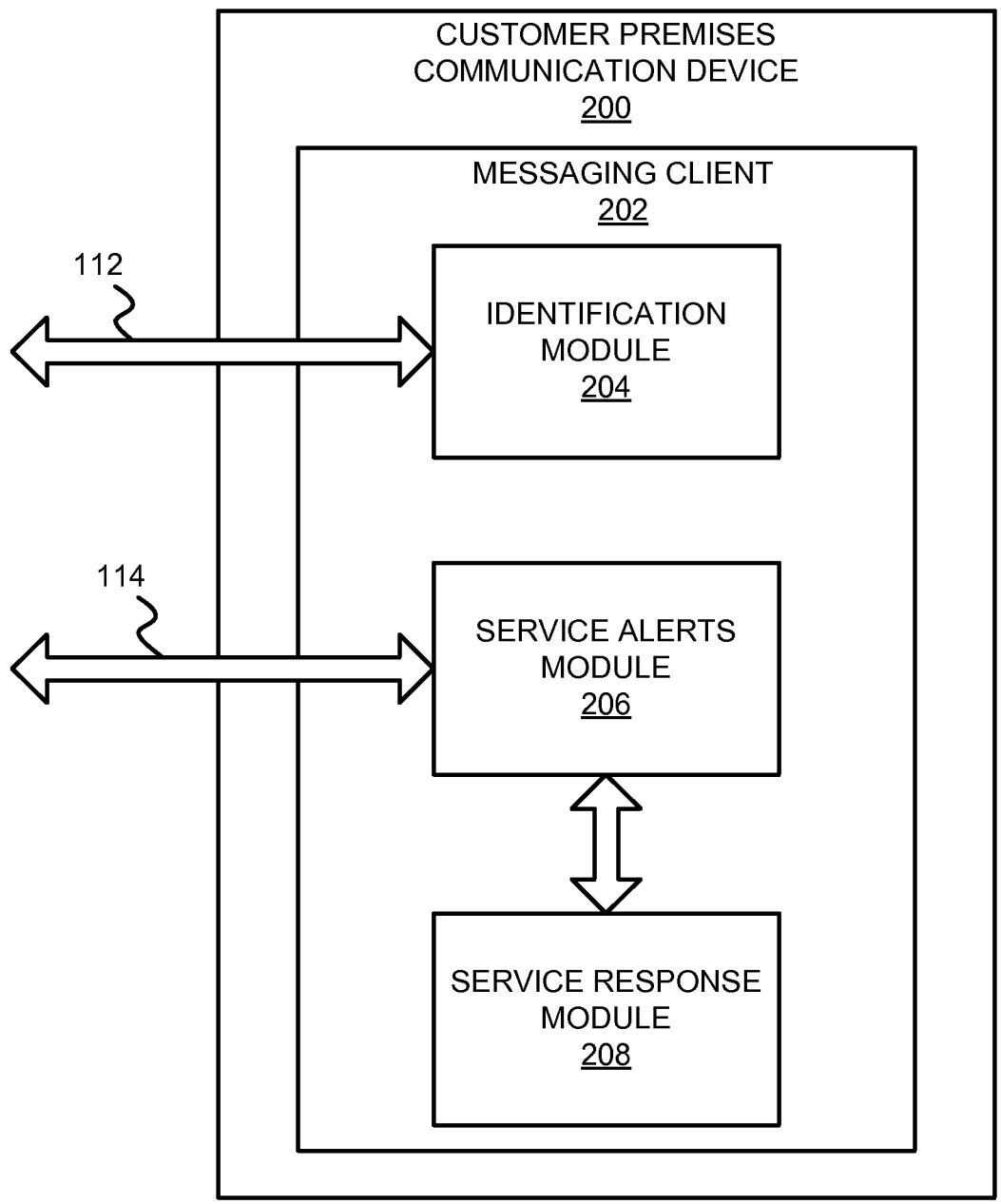
FIG. 2A illustrates an exemplary functional block diagram of a customer premises communication device.

FIG. 2A illustrates a functional block diagram of a customer premises communication device 200. Device 200 may correspond to a single device, such as user device 130 depicted in FIG. 1, or a combination of devices, such as STB 140 and television 150 also depicted in FIG. 1. Customer premises communication device 200 includes a messaging client 202. Messaging client 202 may manage interaction with a messaging system, for example messaging system 180 described above with respect to FIG. 1. Messaging client 202 includes an identification module 204, a service alerts module 206, and a service response module 208. The configuration of components of customer premises communication device 200 illustrated in FIG. 2A is for illustrative purposes only. Other configurations may be implemented. Therefore, customer premises communication device 200 may include additional, fewer and/or different components than those depicted in FIG. 2A.

Identification module 204 may provide identifying information for customer premises communication device 200 to provider network 160. For example, identification module 204 may provide identifying information to a server of messaging system 180 on provider network 160. Identification module 204 may retrieve the identifying information from a client registry for customer premises communication device 200.

Service alerts module 206 may receive service alert messages 114 that are pushed from messaging system 180, through routing device 120. Service alerts module 206 may receive service alert messages 114 in a format that may be displayed on customer premises communication device 200. Alternately, service alerts module 206 may receive service alert messages 114 in a particular format and reformat service alert messages 114 for display on customer premises communication device 200.

Service response module 208 may provide a response to service alert message 114. For example, service alert message 114 may include an instruction to update software on customer premises communication device 200 and service response module 208 may initiate an update process for selected applications on customer premises communication device 200. Customer premises communication device 200 may receive software and install the updated software. Service response module 208 may also determine whether particular software is installed on customer premises communication device 200 in response to a corresponding service alert message 114.

Messaging client 202 may provide access to software and functionality on customer premises communication device 200 through messaging system 180. Messaging client 202 may be accessed through messaging system 180 by human interaction input by a processor as well as through automated processes as described below.

Figure 2B:
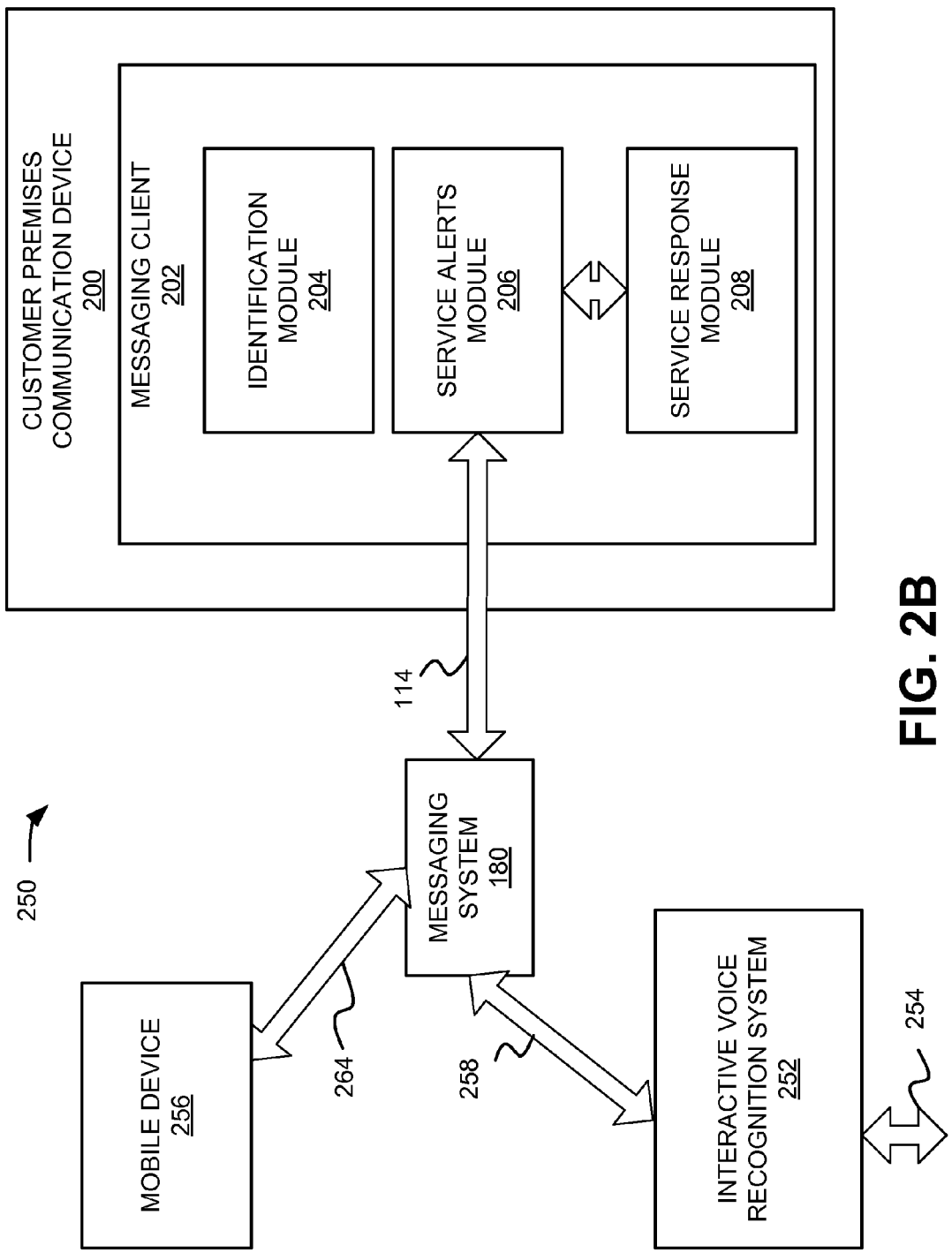
FIG. 2B illustrates an exemplary functional block diagram of a system for providing access for a voice recognition system to a customer communication device.

FIG. 2B illustrates a functional block diagram of a system 250 for providing access for a voice recognition system to a customer communication device through a messaging system. System 250 includes a messaging system 180, an interactive voice recognition system 252, a customer premises communication device 200, and a mobile device 256. The configuration of components of system 250 illustrated in FIG. 2B is for illustrative purposes only. Other configurations may be implemented. Therefore, system 250 may include additional, fewer and/or different components than those depicted in FIG. 2B.

In addition to components described above with respect to FIG. 1 and FIG. 2A, system 250 includes an interactive voice recognition system 252. Interactive voice recognition system 252 processes customer requests made as voiced customer requests 254. System 250 enables interactive voice recognition system 252 to provide automated access to a plurality of customer communication devices, including customer premises communication devices, through messaging system 180. In addition to customer premises communication device 200, system 250 provides access to other customer communication devices, such as mobile device 256 that are identified to the customer account independently of the customer premises network. System 250 enables interactive voice recognition system 252 to initiate and control processes and applications on customer communication devices without assistance of personnel from the telecommunications service provider.

Interactive voice recognition system 252 may comprise an automated voice recognition system that is operable to receive information in an audio format and to output that information as specific instructions to messaging system 180. For example, when a customer calls in or accesses interactive voice recognition system 252, interactive voice recognition system 252 analyzes voiced customer request 254 and determines whether an issue that the customer is calling about is resolvable using messaging system 180. For instance, interactive voice recognition system 252 may determine that the customer is calling to setup an email account on customer premises communication device 200, or to access a website at which the customer may view and pay a bill from the telecommunications service provider.

Interactive voice recognition system 252 may communicate instructions 258 to messaging system 180 and determine whether messaging client 202 is running on customer premises communication device 200. In instances in which messaging client 202 is running on customer premises communication device 200, interactive voice recognition system 252 may direct messaging client 202, through messaging system 180, to automatically fulfill customer requests on customer premises communication device 200. Similarly, interactive voice recognition system 252 may provide mobile device instructions 264 to mobile device 256 using an application that coordinates communications between interactive voice recognition system 252 and applications and processes on mobile device 256. Mobile device 256 may authenticate the identity of the customer using a customer ID.

According to one implementation, messaging system 180 may receive instructions 258 from interactive voice recognition system 252 that include instructions for initiating processes and/or applications on customer premises communication device 200, based on, for example, specific customer requests. For example, messaging system 180 may receive messaging system instructions 258 from interactive voice recognition system 252 that include a customer request to initiate particular processes or applications on customer premises communication device 200. Messaging system 180 may output a service alert message 114 to customer premises communication device 200 that initiates the processes and/or applications. Messaging system 180 may receive and relay an outcome of the processes to interactive voice recognition system 252. Interactive voice recognition system 252 may forward the customer to a live agent in the event of an unsatisfactory outcome or a determination that a live agent is needed.

FIG. 3 is a diagram of exemplary components of a device 300. Device 300 may correspond to routing device 120, user device 130, STB 140, home network backend system 170, messaging system 180, interactive voice recognition system 252, or mobile device 256. Each of routing device 120, user device 130, STB 140, home network backend system 170, messaging system 180, interactive voice recognition system 252, or mobile device 256 may include one or more devices 300. As shown in FIG. 3, device 300 may include a bus 310, a processing unit 320, a memory 330, an input device 340, an output device 350, and a communication interface 360. Bus 310 may permit communication among the components of device 300. Processing unit 320 may include any type of processor or microprocessor that interprets and executes instructions. In other implementations, processing unit 320 may be implemented as or include an application specific integrated circuit (ASIC), field programmable gate array (FPGA), or the like. Memory 330 may include a random access memory (RAM) or another type of dynamic storage device that stores information and instructions for execution by processing unit 320, a read only memory (ROM) or another type of static storage device that stores static information and instructions for processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, a remote, etc. Output device 350 may include a device that outputs information to the operator, such as a display, a speaker, etc.

In an exemplary implementation, device 300 may perform operations in response to processing unit 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
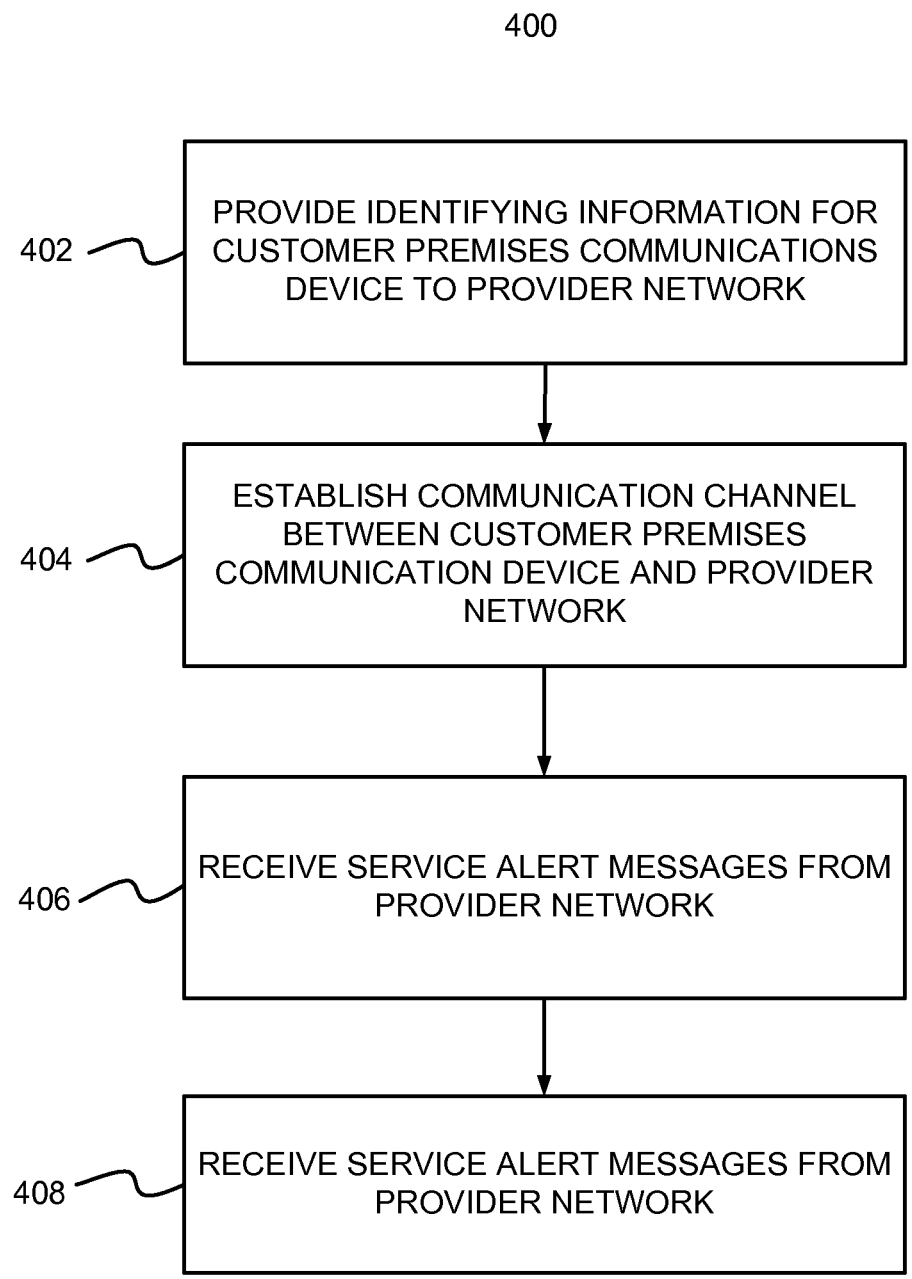
FIG. 4 is a flowchart of an exemplary process for providing service alerts to a customer premises communication device.

FIG. 4 is a flowchart of an exemplary process 400 for providing service alerts to a customer premises communication device 200 (e.g., user device 130, STB 140), etc. Process 400 may execute in each customer premises communication device 200 (e.g., user device 130, STB 140). It should be apparent that the process discussed below with respect to FIG. 4 represents a generalized illustration and that other elements may be added or existing elements may be removed, modified or rearranged without departing from the scope of process 400.

At block 402, identifying information for customer premises communication device 200 may be provided to provider network 160 by identification module 204. For example, identification module 204 may contact the telecommunications service provider network upon initialization of customer premises communication device 200 in customer premises network 110. Identification module 204 may provide passwords and other information requested by provider network 160 in order for provider network 160 to verify the identity of customer premises communication device 200 and associated customer account. Further, identification module 204 may participate in other identification, authentication, and/or authorization procedures for customer premises network 110 and/or customer premises communication device 200 with provider network 160.

At block 404, a communication channel may be established between customer premises communication device 200 and provider network 160. For example, service alerts module 206 may register a communication channel with provider network 160 using a client registry upon establishment of the communication channel by provider network 160 as described in detail below. The communication channel may be allocated to specific types of service alert messages 114 related to the customer account at provider network 160. The identity of customer premises communication device 200 may include an associated customer account.

For example, the customer may select customer premises communication device 200 to receive service alert messages 114 that are Internet service related, as well as all billing service alert messages 114 for the customer account (including, for example, cable service bills). The customer may input the selections using a graphical user interface (GUI) provided for device 200 after the customer is authenticated. The customer may also select multiple communications channels to receive service alert messages 114. For example, the customer may select additional communication channels, such as social media applications and/or mobile devices as well as customer premises communication device 200 to receive service alert messages 114 regarding promotional alerts for the cable service or other service.

At block 406, a service alert message 114 may be received from provider network 160 by service alerts module 206. For example, service alert messages 114 may be pushed from messaging system 180 through routing device 120, as described above with respect to FIG. 1, to customer premises communication device 200. Service alerts module 206 may receive service alert messages 114 in a format that may be displayed on customer premises communication device 200. Alternately, service alerts module 206 may receive service alert messages 114 in a particular format and reformat service alert messages 114 in a format compatible for display on customer premises communication device 200. Service alerts module 206 may receive service alert messages 114 that are informational or service alert messages 114 that provide a capability to respond as described below.

For example, at block 408, service response module 208 may generate a response to service alert message 114. Service response module 208 may provide a response based on the particular service alert message 114. For example, the particular service alert message 114 comprises an instruction to update software on customer premises communication device 200. In this instance, service response module 208 initiates an update process for selected applications on customer premises communication device 200. Service response module 208 may initiate the update process automatically. Alternately, service response module 208 may perform the update process based on input from a user via a GUI provided for device 200. Customer premises communication device 200 may receive software and install the updated software. Service response module 208 may also determine whether particular software is installed on customer premises communication device 200 in response to a corresponding service alert message 114.

As another example, service response module 208 may automatically start a session on customer premises communication device 200 to install an email program in response to a determination that an email program has not been installed on customer premises communication device 200. Additionally, service response module 208 may configure customer premises communication device 200 in response to a service alert message 114 that instructs service response module 208 to configure customer premises communication device 200. In each case, service response module 208 may automatically perform one or more actions and/or provide a request for a user to provide instructions in response to a service alert message 114.

Figure 5:
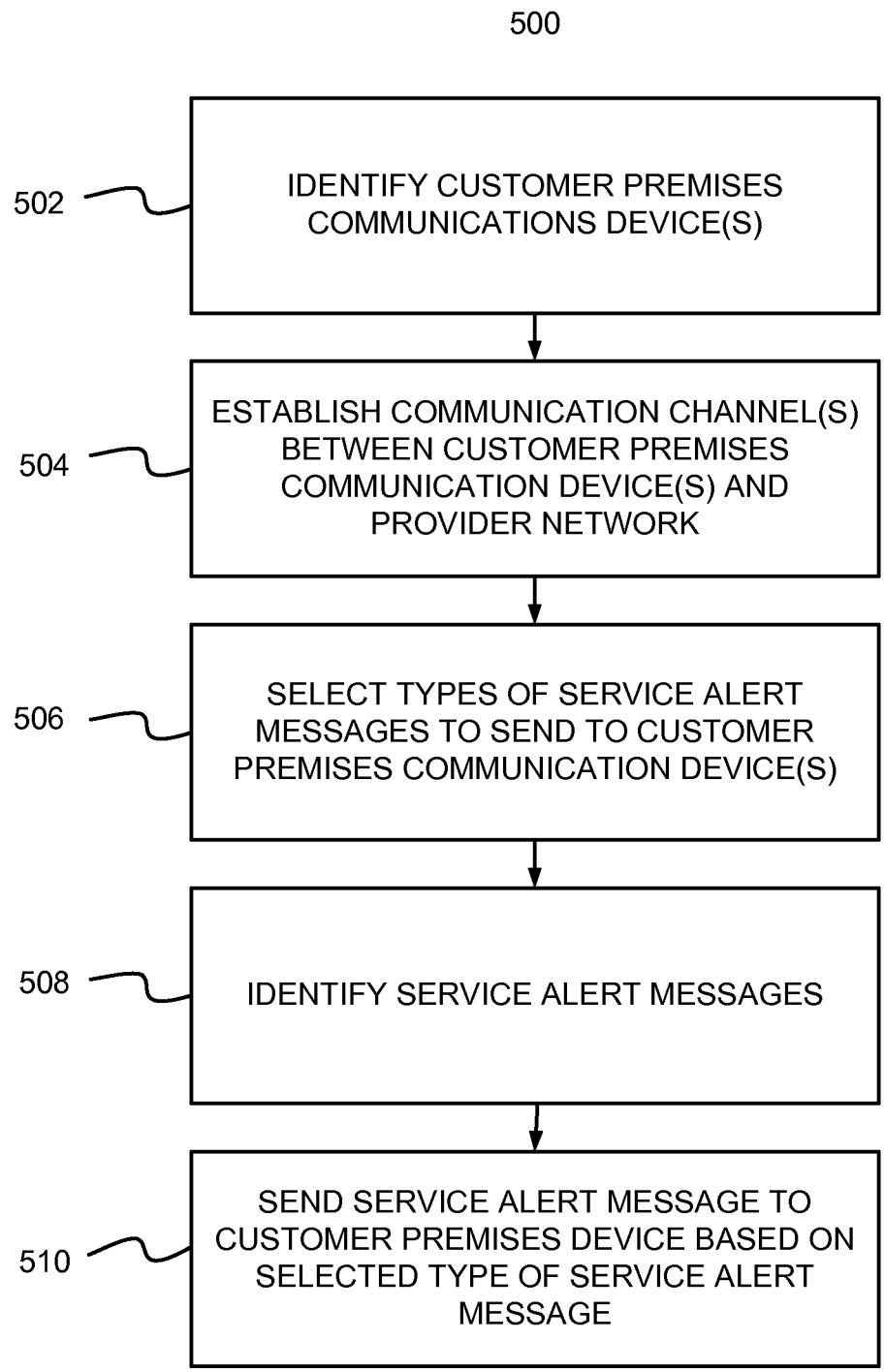
FIG. 5 is another flowchart of an exemplary process for providing service alerts to a customer premises communication device.

FIG. 5 is a flowchart of an exemplary process 500 for providing service alerts to customer premises communication device 200 (e.g., user device 130, STB 140). Process 500 may execute in a provider network, such as provider network 160, which may include home network backend system 170, and messaging system 180. It should be apparent that the process discussed below with respect to FIG. 5 represents a generalized illustration and that other elements may be added or existing elements may be removed, modified or rearranged without departing from the scope of the process 500.

At block 502, at least one customer premises communication device 200 may be identified by provider network 160. Provider network 160 may identify multiple customer premises communication devices 200 at different times for a same customer account and customer premises network 110. Provider network 160 may identify customer premises communication device 200 in response to provisioning of identifying information by customer premises communication device 200 as described above at block 402. More particularly, as customer premises communication devices 200 are added to customer premises network 110, provider network 160 may associate each customer premises communication devices 200 with a customer account.

At block 504, communication channels may be established between each customer premises communication device 200 and provider network 160. For example, home network backend system 170 may establish communications channels for each of multiple customer premises communication devices 200 at different times. Home network backend system 170 may establish the communications channel by creating port mapping rules for customer premises communication device 200 and provider network 160. For instance, home network backend system 170 may establish one communication channel for a user device 130 and another communication channel for STB 140. Home network backend system 170 may also transfer port mapping 116 to messaging system 180.

In one implementation, the communication channels are established between each customer premises communication device 200 and provider network 160 by creating a port mapping 116 between the ports of the customer premises communication device and provider network 160. The port mapping 116 may be registered in a client registry.

At block 506, types of service alerts that are to be sent to the customer premises communication devices 200 are selected, for instance, by messaging system 180. For example, messaging system 180 may receive instructions to push service alert messages 114 to a particular customer premises communication device 200. The types of service alert messages 114 may be selected and input to messaging system 180 (e.g., using a web interface) by an administrator and/or the customer. For example, the customer may select the types of service alert messages 114 throughout the course of receiving service from the telecommunications service provider. The device 200 may be provided with a GUI that allows the customer to easily select communications channels via which to receive service alert messages 114. For instance, the customer may select different customer premises communication devices 200 to receive different types of service alert messages 114 from provider network 160 and provide the updated selections to provider network 160. In addition to the customer premises communication devices 200, the customer may select other communication channels, such as web-based applications and mobile devices to receive particular service alert messages 114.

At block 508, messaging system 180 may identify service alert messages 114. For example, service alert messages 114 may be determined by receiving input data regarding an order status, a promotional item, a service outage notice, a technical support visit schedule, and an upcoming program alert. The information may be output as service alert messages 114 including, respectively, an order status alert, a promotional alert, a service outage alert, a technical support information alert, and a program alert. According to another example, messaging system 180 determines a billing status alert, promotion expiration alert, a bundle contract expiration alert based on a payment due date or a scheduled time of expiration of each item.

At block 510, service alert messages 114 may be sent to the customer premises communication devices 200 based on the selected type of service alert message 114. For example, after service information 122 is received, a determination may be made whether to send a service alert message 114 and what type of service alert message 114 is to be sent. Service alert messages 114 may be sent substantially simultaneously with the generation of the particular service alert messages 114. For example, provider network 160 may receive service information 122 from technical support personnel and output the service information as a service alert message 114 in real time or near real time.

Figure 6:
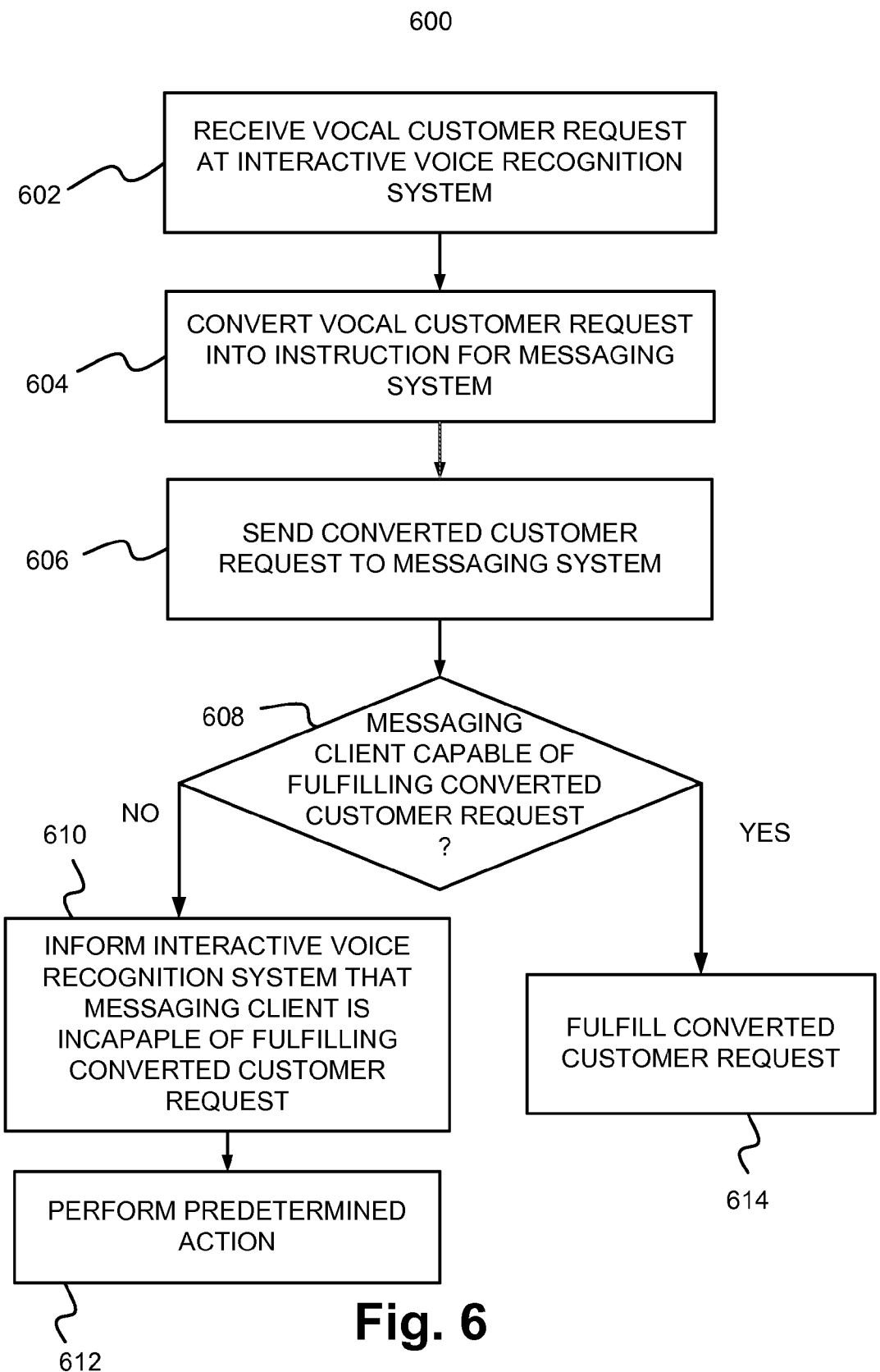
FIG. 6 is a flowchart of an exemplary process for providing access for an interactive voice recognition system to a customer communication device through a messaging system.

FIG. 6 is a flowchart of an exemplary process 600 for providing access for an interactive voice recognition system to a customer communication device through a messaging system. Process 600 may execute in a system, for example system 250 described with respect to FIG. 2B. More particularly, elements of process 600 may execute in components of system 250 including messaging system 180, interactive voice recognition system 252, customer premises communication device 200, and mobile device 256. Although elements of process 600 are described with respect to system 250, it should be understood that the process 600 is applicable to other systems. Additionally, it should be apparent that the process discussed below with respect to FIG. 6 represents a generalized illustration and that other elements may be added or existing elements may be removed, modified or rearranged without departing from the scope of the process 600.

At block 602, a voiced customer request 254 may be received from a customer by interactive voice recognition system 252. For example, the customer may call in or access interactive voice recognition system 252 regarding an issue with a service provided by the telecommunications service provider. Interactive voice recognition system 252 may provide a menu of choices for the customer and the customer may provide voiced customer request 254 and select a particular choice by voicing the selected choice.

At block 604, voiced customer request 254 may be converted into a format that may be processed by messaging system 180. For example, interactive voice recognition system 252 may convert voiced customer request 254 into a format compatible with messaging system 180. Converted customer request 258 may include a request for installation of an email account using interactive voice recognition system 252.

At block 606, converted customer request 258 may be sent to messaging system 180 by interactive voice recognition system 252. For example, interactive voice recognition system 252 may send information including a customer identifier and details of the customer request in converted customer request 258.

At block 608, messaging system 180 determines whether messaging client 202 is capable of fulfilling the converted customer request 258 using messaging client 202 and software installed on customer premises communication device 200 via service response module 208. For example, service response module 208 may consult directories on customer premises communication device 200 to determine available programs and applications.

At block 610, in response to a determination at block 608 that the converted customer request 258 cannot be fulfilled using messaging client 202, messaging system 180 sends a message to interactive voice recognition system 252 that converted customer request 258 cannot be fulfilled using messaging client 202. For instance, messaging system 180 may determine that messaging client 202 is not installed on customer premises communication device 200. Alternately, messaging client 202 may determine that the software has not been uploaded to customer premises communication device 200.

At block 612, interactive voice recognition system 252 may perform a predetermined action upon receiving a message from messaging system 180 that the request cannot be fulfilled using messaging client 202. For example, interactive voice recognition system 252 may inform the customer that customer request 258 cannot be fulfilled. Alternately, or additionally, interactive voice recognition system 252 may transfer the customer to a live agent to attempt to fulfill the customer request.

Referring back to block 608, in response to a determination that customer request 258 can be fulfilled, using messaging client 202, messaging client 202 may fulfill customer request 258 at block 614. For example, service response module 208 may install an email program, thereby fulfilling customer request 258.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, while series of blocks have been described with respect to FIGS. 4, 5 and 6, the order of the blocks may be modified in other implementations. Further, non-dependent blocks may be performed in parallel. It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Although the implementations described above mainly refer to a telecommunications service provider providing alerts to a customer, in other implementations, other types of service providers, retailers, etc. may provide alerts to customers. Additionally, the above teachings may be implemented in other relationships such as a corporate head office providing alerts to divisional offices, and/or franchisees.

Further, certain portions of the invention may be implemented as a "component" that performs one or more functions. These components may include hardware, such as a processor, an ASIC, or a FPGA, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
  providing identifying information for at least one of a plurality of customer premises communication devices to a provider network for at least one telecommunications service, wherein the plurality of customer premises communication devices include a set top box and at least one computer connected to a customer premises network via a router;
  providing port mapping information to a service provider device in the provider network to register a communication channel between the at least one of the plurality of customer premises communication devices and the provider network, wherein, when performing a port mapping, the service provider device is to register the port mapping in a client registry and perform the port mapping using a routing table at the router in the customer premises network, wherein an interactive voice recognition system is configured to access the plurality of customer premises communication devices via the ort mapping;
  identifying a process to be implemented in association with a particular one of the plurality of customer premises communication devices; and
  receiving at least one service alert message in a format that is displayable by the at least one of the plurality of customer premises communication devices from the provider network using the communication channel, wherein the at least one service alert message provides instruction to respond based on a port mapping that corresponds to the particular one of the plurality of customer premises communication devices, the at least one service alert message includes service information that affects the process to be implemented at the particular one of the plurality of customer premises communication devices and the at least one service alert message is selected based on the particular one of the plurality of customer premises communication devices and at least one type associated with the service alert message.

2. The computer-implemented method of claim 1, further comprising:
  selecting the at least one type associated with the at least one service alert message from a plurality of types of service alert messages available from a messaging system.

3. The computer-implemented method of claim 1, wherein the at least one service alert message comprises an instruction to upgrade an application security suite.

4. The computer-implemented method of claim 1, wherein the at least one computer comprises at least one of a personal computer, a laptop computer, or a tablet computer.

5. The computer-implemented method of claim 1, wherein the at least one service alert message comprises at least one of a billing status alert, an order status alert, a service outage alert, a technical support information alert, a promotion expiration alert, or a bundle contract expiration alert.

6. The computer-implemented method of claim 1, further comprising:
  selecting a social media application as a communication channel to receive the at least one service alert message.

7. A computer-implemented method comprising:
  identifying at least one of a plurality of customer premises communication devices included in a customer premises network, wherein the customer premises network is associated with a customer account and receives at least one telecommunications service, and the plurality of customer premises communication devices are nodes of the customer premises network and include a set top box and at least one computer connected to the customer premises network via a router;
  performing a port mapping between each of the plurality of customer premises communication devices to establish a communication channel between the at least one of the plurality of customer premises communication devices and a provider network, wherein performing the port mapping includes registering the port mapping in a client registry and performing the port mapping using a routing table at the router in the customer premises network, wherein an interactive voice recognition system is configured to access the plurality of customer premises communication devices via the ort mapping;

identifying a process to be implemented in association with a particular one of the plurality of customer premises communication devices;

selecting at least one type of service alert message to send to the at least one of the plurality of customer premises communication devices, wherein the at least service alert message includes service information that affects the process to be implemented at the particular one of the plurality of customer premises communication devices;

identifying at least one service alert message based on the selected at least one type of service alert message; and sending the at least one service alert message to the at least one of the plurality of customer premises communication devices based on the selected at least one type of service alert message.

8. The computer-implemented method of claim 7, further comprising:

receiving service information;

determining whether the service information is applicable to the at least one of the plurality of customer premises communication devices; and outputting a service alert message based on the service information to the at least one of the plurality of customer premises communication devices.

9. The computer-implemented method of claim 7, further comprising:

selecting at least one additional communication channel to receive the service alert messages.

10. A device in a service provider network for providing at least one telecommunications service, comprising:

a memory to store a plurality of instructions; and a processor configured to execute instructions in the memory to:

receive identifying information for a plurality of customer premises communication devices associated with a customer account for at least one telecommunications service received from the service provider network, wherein the plurality of customer premises communication devices include a set top box and at least one computer connected to a customer premises network via a router;

perform a port mapping between each of the plurality of customer premises communication devices to establish a communication channel between each of the customer premises communication devices and the service provider network via a messaging system associated with the service provider network, wherein, when performing the port mapping, the processor is to register the port mapping in a client registry and perform the port mapping using a routing table at the router in the customer premises network, wherein an interactive voice recognition system is configured to access the plurality of customer premises communication devices via the port mapping;

identify a process to be implemented in association with a particular one of the plurality of customer premises communication devices; and provide at least one service alert message from the service provider network to at least one of the plurality of customer premises communication devices via the communication channel, wherein the at least one service alert message provides instruction to respond based on a port mapping that corresponds to the at least one of the plurality of customer premises communication devices, the at least one service alert message includes service information that affects the process to be implemented at the particular one of the plurality of customer premises communication devices and is selected based on the at least one of the plurality of customer premises communication devices and a type associated with the service alert message.

11. The device of claim 10, wherein the processor is further configured to receive a selection of the at least one type associated with the service alert message from a plurality of types of service alert messages.

12. The device of claim 10, wherein, when providing the at least one service alert message, the processor is further configured to provide an instruction to upgrade an application security suite.

13. The device of claim 10, wherein, when providing the at least one service alert message, the processor is further configured to provide at least one of a billing status alert, an order status alert, a promotional alert, a service outage alert, a technical support information alert, a promotion expiration alert, a bundle contract expiration alert or a program alert.

14. The device of claim 10, wherein, when providing the at least one service alert message, the processor is further configured to provide the at least one service alert message to at least one of a personal computer, a laptop computer, or a tablet computer associated with the customer account via the port mapping.

15. A non-transitory computer-readable medium including instructions to be executed by a processor, the instructions including one or more instructions, when executed by the processor, for causing the processor to:

provide identifying information for at least one of a plurality of customer premises communication devices to a provider network, wherein the plurality of customer premises communication devices include a set top box and at least one computer connected to a customer premises network via a router;

provide port mapping information to a service provider device in the provider network to register a communication channel between the at least one of the plurality of customer premises communication devices and the provider network, wherein, when performing a port mapping, the service provider device is to register the port mapping in a client registry and perform the port mapping using a routing table at the router in the customer premises network, wherein an interactive voice recognition system is configured to access the plurality of customer premises communication devices via the ort mapping;

identify a process to be implemented in association with a particular one of the plurality of customer premises communication devices; and receive at least one service alert message in a format that is displayable on the at least one of the plurality of customer premises communication devices from the provider network using the communication channel, wherein the at least one service alert message provides instruction to respond based on a port mapping that corresponds to the at least one of the plurality of customer premises communication devices, the at least one service alert message includes service information that affects the process to be implemented at the particular one of the plurality of customer premises communication devices and the at least one service alert message is selected based on the at least one of the plurality of customer premises communication devices and at least one type associated with the service alert message.

16. The non-transitory computer-readable medium of claim 15, where the one or more instructions further includes instructions for causing the processor to:
receive, from a user, a selection identifying the at least one type associated with the at least one service alert message from a plurality of types of service alert messages.

17. The non-transitory computer-readable medium of claim 15, where the at least one service alert message comprises at least one of a billing status alert, an order status alert, a promotional alert, a service outage alert, a technical support information alert, a promotion expiration alert, a bundle contract expiration alert or a program alert.

18. The computer-implemented method of claim 7,
wherein at least one of a messaging system or the interactive voice recognition system is configured to access the plurality of customer premises communication devices via the port mapping.

19. The non-transitory computer-readable medium of claim 15, wherein the at least one service alert message comprises an instruction to upgrade an application security suite.

20. The non-transitory computer-readable medium of claim 15, wherein the at least one computer comprises at least one of a personal computer, a laptop computer, or a tablet computer.

\* \* \* \* \*